United States Patent
Kwak

(10) Patent No.: US 8,701,203 B2
(45) Date of Patent: Apr. 15, 2014

(54) COMPUTER SYSTEM AND METHOD OF CONTROLLING THE SAME

(75) Inventor: Woon-geun Kwak, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 468 days.

(21) Appl. No.: 12/829,487

(22) Filed: Jul. 2, 2010

(65) Prior Publication Data

US 2011/0061101 A1  Mar. 10, 2011

(30) Foreign Application Priority Data

Sep. 9, 2009  (KR) .................. 10-2009-0084840

(51) Int. Cl.
*G06F 7/04* (2006.01)
*H04L 29/06* (2006.01)

(52) U.S. Cl.
USPC ............................... 726/26; 726/28; 713/155

(58) Field of Classification Search
USPC ...................... 726/26, 28; 713/155
See application file for complete search history.

(56) References Cited

U.S. PATENT DOCUMENTS

| | | | | |
|---|---|---|---|---|
| 8,041,749 B2* | 10/2011 | Beck | ............................. | 707/803 |
| 8,208,157 B2* | 6/2012 | Kaneko et al. | .............. | 358/1.15 |
| 8,230,485 B2* | 7/2012 | Reasor et al. | ...................... | 726/5 |
| 2002/0112155 A1* | 8/2002 | Martherus et al. | ............ | 713/155 |
| 2002/0112183 A1* | 8/2002 | Baird et al. | ................... | 713/201 |
| 2004/0050929 A1* | 3/2004 | Fayfield | ........................ | 235/380 |
| 2006/0225132 A1* | 10/2006 | Swift et al. | ..................... | 726/11 |
| 2007/0239998 A1* | 10/2007 | Beck | ............................ | 713/193 |
| 2007/0277235 A1* | 11/2007 | Barrett et al. | ................... | 726/12 |
| 2008/0163367 A1* | 7/2008 | Lee et al. | ........................ | 726/21 |
| 2009/0249443 A1* | 10/2009 | Fitzgerald et al. | ................ | 726/2 |
| 2010/0281252 A1* | 11/2010 | Steeves et al. | ................ | 713/155 |

* cited by examiner

*Primary Examiner* — Krisna Lim
(74) *Attorney, Agent, or Firm* — Cha & Reiter, LLC

(57) ABSTRACT

A computer system including that restricts access of an unauthorized. The computer system preferably includes: a system unit; an identification information storage unit storing user identification information about a user of the computer system; a communication unit communicating with a service server storing user authentication information about the user of the computer system; and a controller receiving the user authentication information corresponding to the user identification information through the communication unit and controlling the system unit to perform a selective operation on the basis of the user authentication information.

17 Claims, 6 Drawing Sheets

COMPUTER SYSTEM AND METHOD OF CONTROLLING THE SAME

CLAIM OF PRIORITY

This application claims priority from Korean Patent Application No. 10-2009-0084840, filed on Sep. 9, 2009 in the Korean Intellectual Property Office, the disclosure of which is incorporated herein by reference in its entirety.

BACKGROUND OF THE INVENTION

1. Field of the Invention

The present invention relates to apparatuses and methods related to a computer system and a method of controlling the same. More particularly, the present invention relates to a computer system which restricts access to a particular function or functions and a method of controlling the same.

2. Description of the Related Art

A computer system, such as a laptop, notebook, tablet, desktop, etc., provides a user with a variety of functions. However, as necessary, there is a need to restrict access of a user(s) to certain functions of the computer system.

For example, in the case where a computer system is rent or leased to a specific user, or sold at a discount on condition of using a service for a certain period, it may be desirable to prevent an unaccredited user, or a user who does not have right to access the computer system because of non-payment of rental fees and/or service fees. In the conventional art, in the case where a user tries to access a communication service such as the Internet through a computer system, the communication service can be blocked when the user attempts access, thereby restricting use of the computer system. However, even if blocking the particular communication service, the user cannot be prevented from accessing other functions of the computer system. Thus, there occurs a problem in that the user improperly uses the computer system.

SUMMARY OF THE INVENTION

Accordingly, one or more exemplary embodiments provide a computer system which restricting access of an unauthorized user thereto and a method of controlling the same.

The foregoing and/or other exemplary aspects may be achieved by providing a computer system including: a system unit; an identification information storage unit storing user identification information about a user of the computer system; a communication unit communicating with a service server storing user authentication information about the user of the computer system; and a controller receiving the user authentication information corresponding to the user identification information through the communication unit and controlling the system unit to perform a selective operation on the basis of the user authentication information.

The controller may include, for example, a first controller for outputting a control signal corresponding to the user authentication information and a second controller for controlling the system unit to perform a selective operation according to the control signal output by the first controller.

The computer system may include, for example, a main board, wherein at least one of the communication unit and the identification information storage unit is detachable from the main board.

The controller may stop the system unit from performing an operation when at least one of the communication unit and the identification information storage unit is not mounted.

The computer system may include, for example, a notification unit, wherein the controller informs the user through the notification unit that at least one of the communication unit and the identification information storage unit is not mounted.

The computer system may also include a notification unit, wherein the controller informs the user through the notification unit that at least one of the communication unit and the identification information storage unit is not mounted.

The computer system may also include a notification unit through which the controller informs the user through the notification unit that the system unit does not perform a particular operation.

The controller may control the system unit so as not to be booted up.

The computer system may also include a power source supplying operation power to the system unit, wherein the controller controls the power source so as not to supply operation power to the system unit.

Another exemplary aspect of the present invention is achieved by providing a method of controlling a computer system that preferably includes: receiving user authentication information corresponding to user identification information about a user of the computer system from a service server; and controlling a system unit of the computer system to perform a selective operation on the basis of the user authentication information.

The controlling may preferably include outputting a control signal corresponding to the user authentication information and controlling the system unit to perform a selective operation according to the control signal.

The method may preferably include controlling the system unit so as not to perform an operation when at least one of a communication unit communicating with the service server and an identification information storage unit storing the user identification information is not mounted in the computer system.

The method may preferably include informing the user that at least one of the communication unit and the identification information storage unit is not mounted in the computer system.

The controlling may preferably include controlling the system unit not to be booted up.

The controlling may also include controlling a power source of the computer system so as not to supply operational power to the system unit.

Another exemplary aspect of the present invention is achieved by providing a computer system preferably including: a system unit; an interface unit interfacing with a communication unit communicating with a service server storing user authentication information about a user of the computer system; and a controller receiving the user authentication information corresponding to user identification information about the user of the computer system through the communication unit and controlling the system unit to perform a selective operation on the basis of the user authentication information.

BRIEF DESCRIPTION OF THE DRAWINGS

The above and/or other exemplary aspects will become apparent and more readily appreciated from the following description of the exemplary embodiments, taken in conjunction with the accompanying drawings, in which.

DETAILED DESCRIPTION

Figure 1:
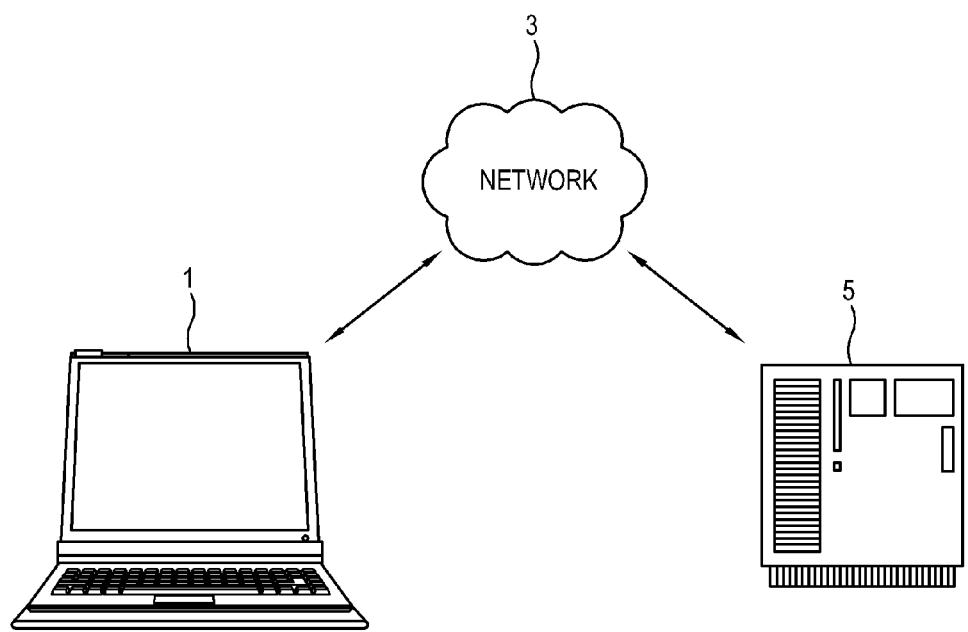
FIG. 1 illustrates a computer system according to one exemplary embodiment of the present invention.

Below, exemplary embodiments of the present invention will now be described in detail with reference to accompanying drawings so as to be easily realized by a person having ordinary knowledge in the art. The exemplary embodiments may be shown in various forms without being limited to the exemplary embodiments set forth herein. Descriptions of well-known parts may be omitted for clarity of the claimed subject matter, and like reference numerals refer to like elements throughout.

FIG. 1 illustrates a computer system according to one exemplary embodiment. The computer system 1 shown in FIG. 1 may be realized as a PC, e.g., a laptop, notebook, tablet, desktop, etc. Further, the computer system according to the exemplary embodiment includes not only ordinary types of PCs, but also any device which has similar functions to those of a PC, such as a mobile phone, a personal digital assistant, just to name a few possibilities.

As shown in FIG. 1, the computer system 1 is connected to a server 5 which provides service via a network 3 such as the Internet. In the present exemplary embodiment, the computer system 1 is regarded as a hypothetical example in which only an authorized user in accordance with rental and service agreements is allowed to have access to the computer system.

The server 5 collects and manages information about use of the computer system 1. For example, the server 5 stores information required for authentication of a user authorized to use the computer system 1 (hereinafter, referred to as "user authentication information").

Figure 2:
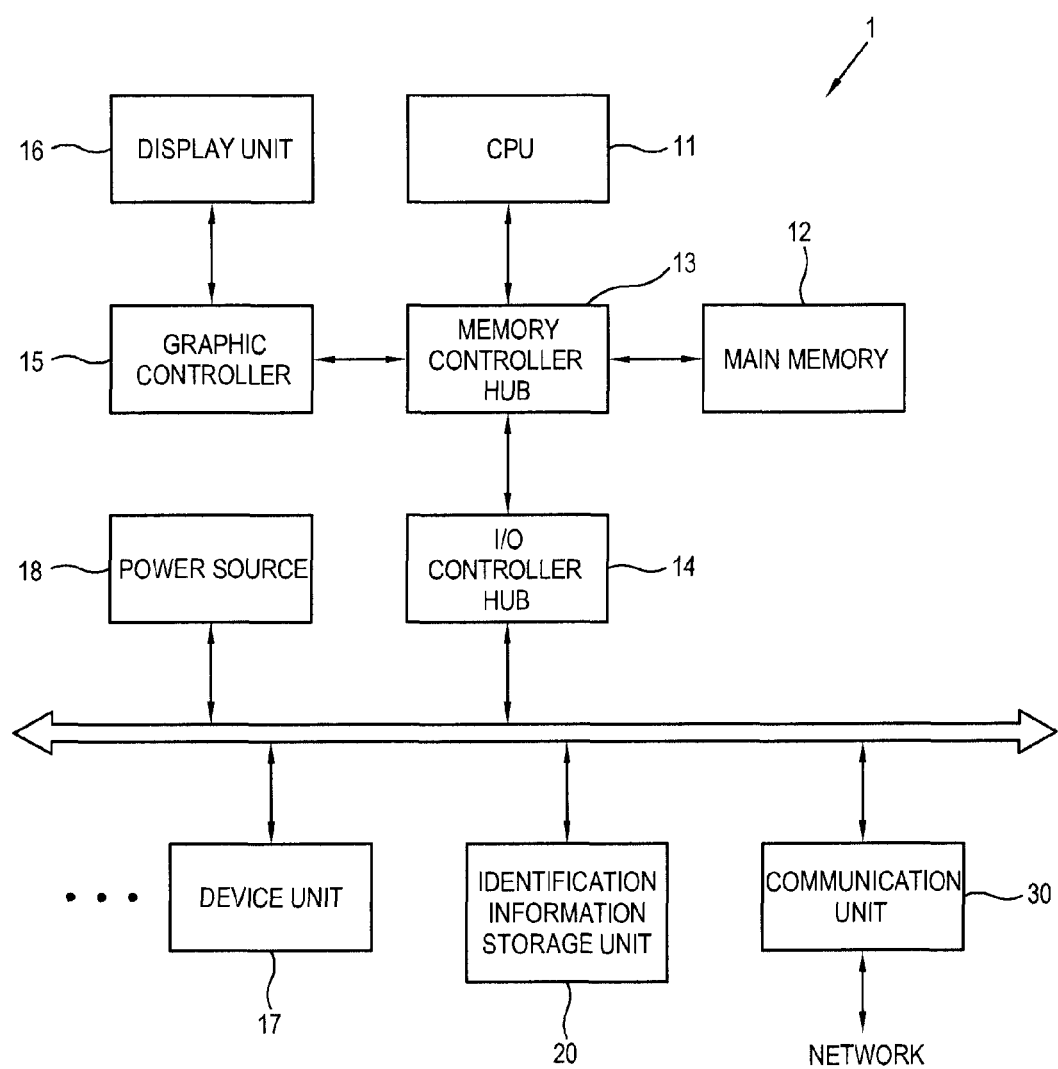
FIG. 2 is a block diagram illustrating a configuration of the computer system according to the exemplary embodiment of the present invention.

FIG. 2 is a block diagram illustrating a configuration of the computer system 1 according to the exemplary embodiment. The computer system 1, as shown in FIG. 2, preferably includes a CPU 11, a main memory 12, a memory controller hub (MCH) 13, an I/O controller hub (ICH) 14, a graphic controller 15, the display unit 16, and at least one device unit 17.

The CPU 11 is a component which controls an overall operation of the computer system 1 and executes a computer program loaded in the main memory 12. In executing a computer program, the CPU 11 communicates with the MCH 13, the ICH 14, and the device 17 and controls each of them. The computer program performed by the CPU 11 includes a BIOS, an OS and an application. In the present exemplary embodiment, the BIOS may be stored in a storage device such as a ROM as a device unit 17, and the OS and the application may be stored in a storage device such as an HDD, SDD, or the like.

The main memory 12 temporarily stores data about performing operations of the CPU 11 including a computer program performed by the CPU 11. The main memory 12 comprises a volatile memory and may be realized, for example, as a double data rate synchronous dynamic random access memory (DDR SDRAM).

With continued reference to FIG. 2, the MCH 13 interfaces a component, such as the CPU 11 or the like, with the main memory 12 to read and write a data. The ICH 14 interfaces the CPU 11 with the peripheral device 40 and controls input/output of the device 17.

The graphic controller 15 processes a graphic data in order to display an image, and the display unit 16 displays an image on the basis of a graphic data processed by the graphic controller 15. The display unit 16 may be provided as an LCD, an OLED, etc. Alternatively, a computer system, such as a desktop computer, may have a display unit provided independently, e.g., a monitor.

The device unit 17 comprises hardware having a function and may be provided as various types, e.g., a mouse, a keyboard, an HDD, an ODD, a CD-ROM, a DVD-ROM, a USB drive, a network card, a sound card, a speaker, a microphone, etc. Although FIG. 2 shows only one device unit 17 for convenience, a person of ordinary skill in the art will appreciate the computer system 1 of the present embodiment may include a plurality of device units 17.

Furthermore, the computer system 1 according to this exemplary embodiment of the present invention may further include an optional power source 18 which supplies operating power to each component.

The computer system 1 of the present exemplary embodiment may further include an identification information storage unit 20 and a communication unit 30. The identification information storage unit 20 stores identification information about a user who wants to use the computer system 1. The identification information storage unit 20 of the present embodiment includes a subscriber identification module (SIM). The communication unit 30 communicates with the server 5 via the network 3.

The computer system 1 according to the exemplary embodiment of the present invention preferably includes a system unit and a controller. The system unit performs an operation of a function of which the computer system 1 can provide to a user. For example, the system unit may be realized as the graphic controller 15, the display unit 16, at least one device unit 17, the power source 18, etc., shown in FIG. 2. Moreover, in another exemplary embodiment, the system unit may include the CPU 11 which executes the OS and/or an application.

Meanwhile, the controller of the present exemplary embodiment controls the system unit to perform a selective operation. For example, the controller may be realized as the CPU 11 which executes the BIOS. However, it should be noted that the system unit and the controller in the present exemplary embodiment are distinguished as a means of performing an operation of a function and a means of controlling an operation performing means, respectively, and different types of examples from those given above may be provided. In the following explanation of the system unit and the controller according to the present embodiment, reference numerals shall be omitted for convenience.

Figure 3:
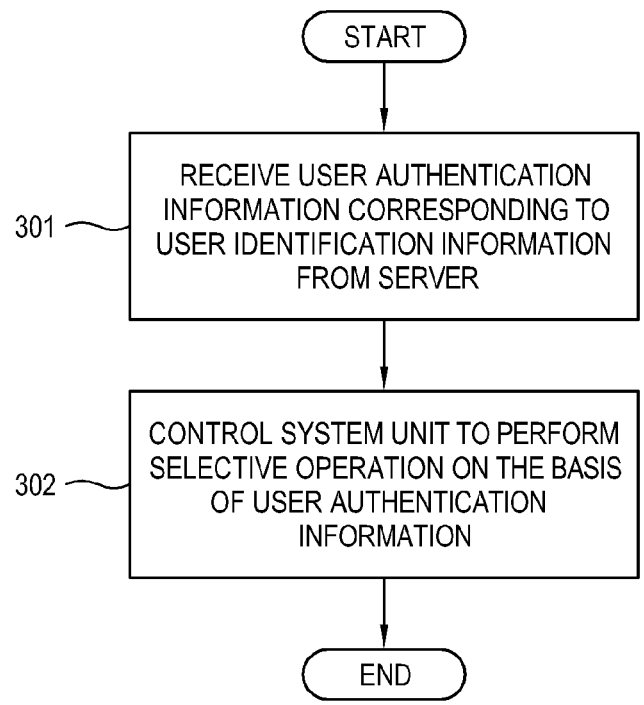
FIG. 3 is a flow chart schematically illustrating an operation of the computer system according to the exemplary embodiment of the present invention.

The controller of the present embodiment is explained in detail with reference to FIG. 3. FIG. 3 is a flow chart illustrating an exemplary operation of the controller according to the exemplary embodiment of the present invention. As shown in FIG. 3, the controller of the present exemplary embodiment receives user authentication information corresponding to user identification information stored in the identification information storage unit 20 from the server 5 through the communication unit 30 (301), and controls the system unit to perform a selective operation on the basis of the received user authentication information (302). In other words, the controller identifies whether or not a user is authorized to use the computer system 1 on the basis of authentication information from the user who wants to access to the computer system 1. If unauthorized, the controller does not allow the system unit to perform an operation of a function.

Accordingly, in the present exemplary embodiment, an unauthorized user cannot gain access to the computer system 1.

User authentication information of the present exemplary embodiment comprises, for example, a user's history related to rental and service agreements or the like including payment of rental fees and/or service fees. Further, operations of the system unit controlled by the controller of the present exemplary embodiment are not limited but include every function which the computer system 1 provides.

Figure 4:
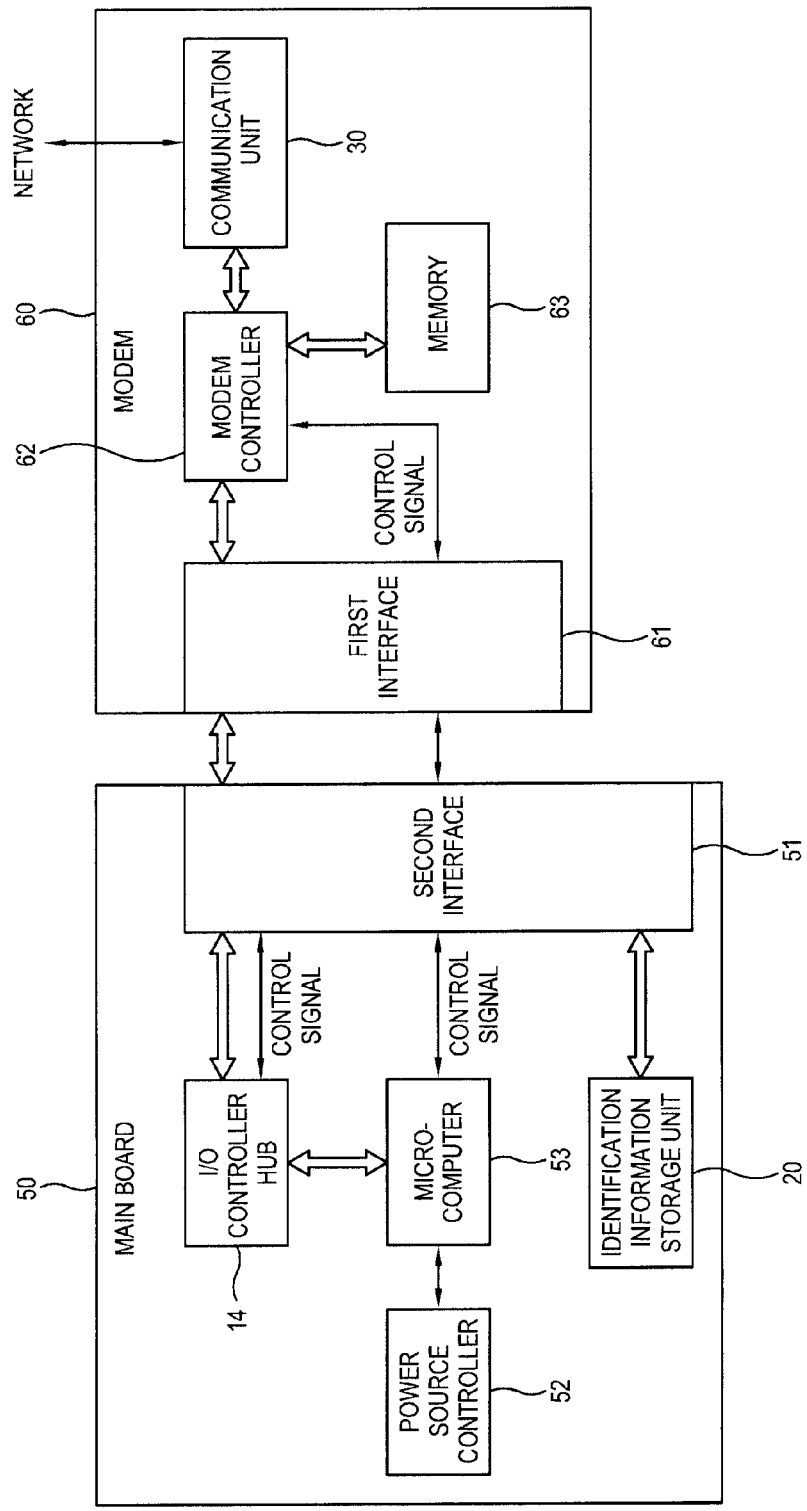
FIG. 4 is a detailed block diagram illustrating the configuration of the computer system according to the exemplary embodiment of the present invention.

The computer system 1 according to the present exemplary embodiment will now be explained in detail with reference to FIG. 4. FIG. 4 illustrates the configuration of the computer system 1 according to the exemplary embodiment in detail. The computer system 1 of the present exemplary embodiment may further include a main board 50 in which the ICH 14 is provided, and a modem 60 in which the communication unit 30 is provided. The modem 60 of the present exemplary embodiment may include a modem controller 62 outputting a control signal corresponding to user authentication information, and the computer system 1 of the present exemplary embodiment may further include a microcomputer 53 controlling the system unit to perform a selective operation according to a control signal output from the modem controller 62. A control signal output by the modem controller 62 may be transmitted to the BIOS through the ICH 14. Meanwhile, a control signal of the present exemplary embodiment may be transmitted using the modem controller 62, the microcomputer 53, and a general purpose input/output (GPIO) port of the ICH 14.

The modem controller 62, the BIOS, and the microcomputer 53 of the present exemplary embodiment send and receive a control signal through a first interface 61 and a second interface 52 which are provided in the modem 60 and the main board 50, respectively.

Communication between the first interface 61 and the second interface 51 in the present exemplary embodiment preferably includes communication according to USB and PCI-E standards. The modem controller 62 of the present embodiment may control an operation of the communication unit 30 so that the modem 60 performs ordinary communication functions.

The modem 60 of the present exemplary embodiment may be detachable from the main board 50, and the first interface 61 and the second interface 51 may have a connector structure in order to combine with each other. In addition, the modem 60 may be provided in a housing (not shown) which protects components of the computer system 1 or may be realized as a separate device outside the housing.

Figure 5:
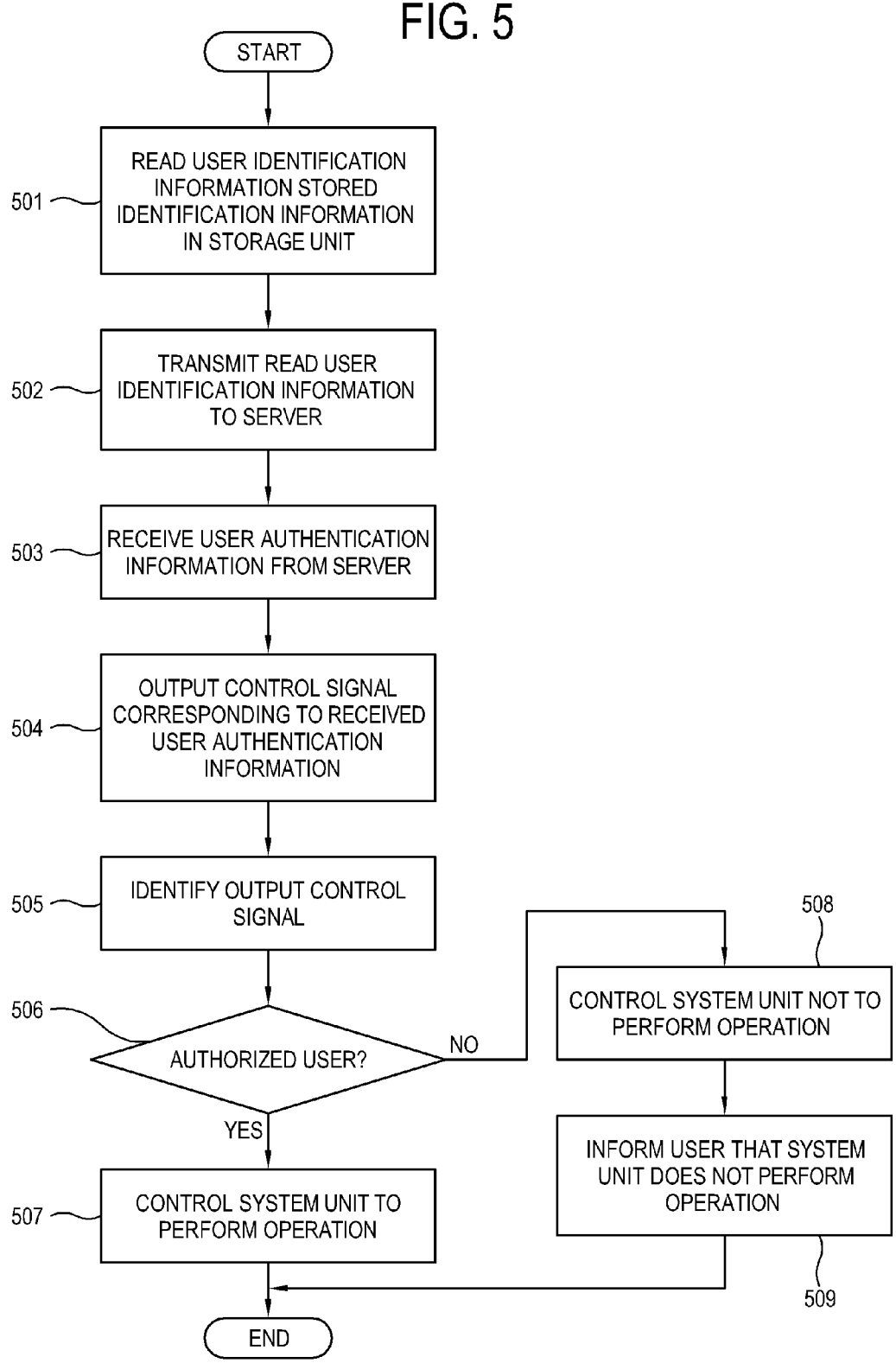
FIGS. 5 and 6 are detailed flow charts illustrating the operation of the computer system according to the exemplary embodiment of the present invention.

Hereinafter, the computer system 1 according to the exemplary embodiment is described in detail with reference to FIGS. 5 and 6. FIG. 5 is a flow chart illustrating the operation of the computer system 1 according to the exemplary embodiment.

First, the modem controller 62 of the present exemplary embodiment at (501) reads out user identification information about a user of the computer system 1 from the identification information storage unit 20 in which the user identification information is stored. As shown in FIG. 4, the identification information storage unit 20 may be provided in the main board 50. The modem controller 62 of the present exemplary embodiment may voluntarily perform operation 501 when the computer system 1 is turned on or operation power starts to be supplied to the modem 60.

Next, at (502) the modem controller 61 transmits the read user identification information to the server 5 and requests transmission of user authentication information corresponding thereto.

Subsequently, at (503), the modem controller 62 receives the user authentication information corresponding to the transmitted user identification information from the server 5 through the network 3.

Then, at (504) the modem controller 61 outputs a control signal corresponding to the received user authentication information to the first interface 61. At operation 504, the modem controller 62 may output a control signal corresponding to the user authentication information with reference to control signal information provided in advance. For example, if determining that a user is authorized on the basis of the user authentication information, the modem controller 62 outputs a control signal at a high level with reference to control signal information. Otherwise, the modem controller 62 outputs a control signal at a low level. Alternatively, various types of control signal may be output depending on authority of a user to access indicated by the user authentication information. The control signal information of the present exemplary embodiment may be stored in a memory 63 provided in the modem 60, shown in FIG. 4.

Next, at (505) the microcomputer 53 of the present exemplary embodiment identifies the control signal output from the modem controller 62. As a result, if the user is determined to be authorized (yes at 506), then at (507) the microcomputer 53 and/or the BIOS control the system unit to perform a normal operation. However, if the user is determined to be unauthorized (no at 506), then at (508) the microcomputer 53 and/or the BIOS control the system unit does not perform a normal operation.

At 508, the microcomputer 53 and/or the BIOS may control the system unit so as not to perform an operation in various ways. For example, the BIOS of the present embodiment may prevent the system unit, i.e., the OS, from being booted up when the computer system 1 is turned on.

Alternatively, the microcomputer 53 can control the system so as not to perform an operation by not allowing power to be supplied to the system unit. For example, the computer system 1 of the present embodiment further includes a power source controller 52 (in FIG. 4) controlling the power source 18, shown in FIG. 2, and the microcomputer 53 can transmit a control signal to the power source controller 52 so that operational power is not supplied to the system unit.

Referring now back to FIG. 5, at (509) when the system unit is limited in operation, the microcomputer 53 and/or the BIOS may inform the user that the system unit is not operational. For example, the BIOS may enable the display unit 16 to display a message informing the user that the system unit is not operational because the user is unauthorized. Accordingly, the user recognizes that he/she is an unauthorized user. According to another exemplary embodiment, the BIOS may provide information that advises or guides the unauthorized user on how to get authorized. Further, the microcomputer 53 of the present exemplary embodiment enables a light emitting unit (not shown), e.g., an LED, to emit light (which may or may not flash), thereby informing the user that the system unit is not being operated. The display unit 16 and/or the LED are just a few illustrative examples of a notification unit according to the exemplary embodiment.

In the present exemplary embodiment, the modem controller 62 of FIG. 4 is an illustrative example of a first controller, and the microcomputer and/or the BIOS are illustrative examples of a second controller. However, the first controller and the second controller according to the exemplary embodiment are not limited thereto.

Figure 6:
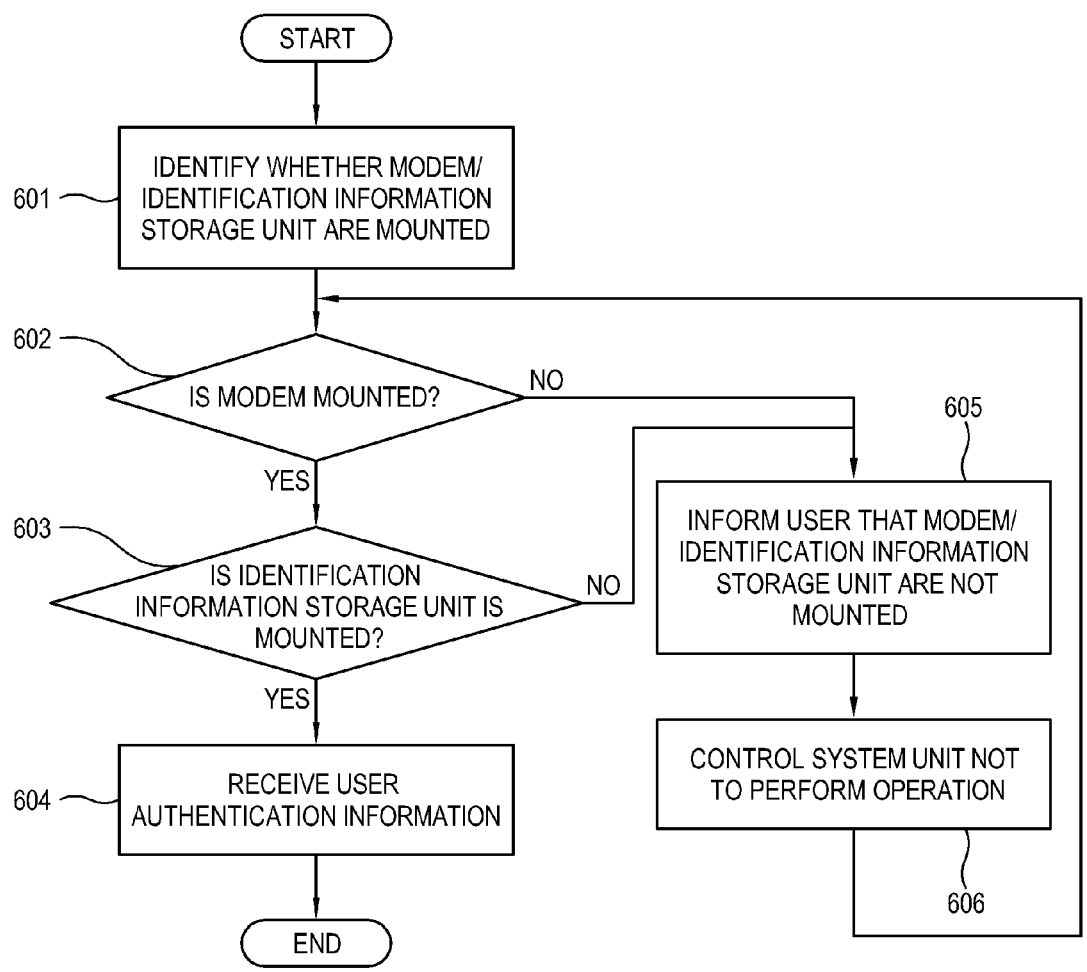

The computer system 1 according to the exemplary embodiment is explained further with reference to FIG. 6. FIG. 6 is a flow chart illustrating the operation of the computer system a according to the exemplary embodiment. In the computer system 1 of the present embodiment, it is presumed that the modem 60 is detachable (e.g. unpluggable, removable) from the main board 50.

Referring now to FIG. 6, at (601) the BIOS of the present exemplary embodiment identifies whether or not the modem 60 is mounted on the main board 50. In the computer system 1 of the present exemplary embodiment, the identification information storage unit 20, such as a SIM, may be also detachable from the main board 50. In this case, the BIOS also identifies whether or not the identification information storage unit 20 is mounted on the main board 50.

As a result, if the modem 60 and/or the identification information storage unit 20 is mounted on the main board 50 (yes at 602 or 603), then at (604) the modem controller 62 of the present exemplary embodiment starts receiving user authentication information), as at 501 to 503 in FIG. 5.

However, if the modem 60 and/or the identification information storage unit 20 is not mounted on the main board 50 (no at 602 or 603), then at (605) the BIOS informs the user that the modem 60 and/or the identification information storage unit 20 is not mounted on the main board 50. In the present exemplary embodiment, the BIOS displays a corresponding message on the display unit 16, or the microcomputer 53 enables the light emitting unit (not shown), e.g., an LED, to emit light.

Next, at (606), the microcomputer 53 and/or the BIOS control the system unit not to perform an operation. At 606, controlling the system unit so as not to operate may be achieved by similar methods to those explained at 508 with reference to FIG. 5. Operations 605 and 606 may be performed in reverse order.

According to the present exemplary embodiment, improper/unauthorized use of the computer system 1 is prevented even in the case where an unauthorized user tries to have access to the computer system 1 in an indirect way by removing the modem 60 or the identification information storage unit 20 so that operations involving the same are not performed.

As described above, the present invention makes it possible to restrict access of an unauthorized user to a computer system.

The above-described methods according to the present invention can be realized in hardware or as software or computer code that can be stored in a machine readable recording medium such as a CD ROM, a RAM, thumbnail drive, a floppy disk, a flash storage, a hard disk, or a magneto-optical disk or downloaded over a network and stored as a non-transitory data on one of the aforementioned mediums, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although a few exemplary embodiments have been shown and described, it will be appreciated by those skilled in the art that changes may be made in these exemplary embodiments without departing from the principles and spirit of the claimed invention, the scope of which is defined in the appended claims and their equivalents. For example, the computer system 1 according to the exemplary embodiment includes the communication unit 30 and the identification information storage unit 20, but a computer system according to another exemplary embodiment may be provided with a communication unit 30 and/or an identification information storage unit 20, which are not included therein but are installable outside.

What is claimed is:

1. A computer system comprising: a system unit comprising a graphic controller and at least one device unit for performing an operation of a function of which the computer system can provide to a user;
   an identification information storage unit storing user identification information regarding at least one user of the computer system;
   a communication unit communicating with a server storing user authentication information regarding the at least one user of the computer system; and
   a controller receiving the user authentication information from the server corresponding to the user identification information through the communication unit, determining whether the user is authorized to access the computer system or not based on the received user authentication information and controlling the system unit not to perform the operation of the function when the user is not authorized to access the computer system,
   wherein the controller totally restricts access of the computer system when at least one of the communication unit and the identification information storage unit is not mounted to a main board.

2. The computer system according to claim 1, wherein the controller comprises a first controller outputting a control signal corresponding to the user authentication information and a second controller controlling the system unit to perform the operation of the function according to the control signal output by the first controller.

3. The computer system according to claim 1, further comprising that at least one of the communication unit and the identification information storage unit is detachable from the main board.

4. The computer system according to claim 3, further comprising a notification unit, wherein the controller informs the user through the notification unit that at least one of the communication unit and the identification information storage unit is not mounted.

5. The computer system according to claim 4, wherein the notification unit comprises a display.

6. The computer system according to claim 3, further comprising a notification unit, wherein the controller informs the user via the notification unit that at least one of the communication unit and the identification information storage unit is not mounted.

7. The computer system according to claim 3, further comprising a notification unit, wherein the controller informs the user via the notification unit that the system unit will not perform the operation of the function because the user is not authorized for access.

8. The computer system according to claim 3, further comprising a notification unit, wherein the controller informs the user through the notification unit that the system unit will not perform the operation of the function because the user is not authorized for access.

9. The computer system according to claim 1, further comprising a notification unit, wherein the controller informs the user via the notification unit that the system unit will not perform the operation of the function because the user is not authorized for access.

10. The computer system according to claim 1, wherein the controller prevents the system unit from being booted up when the user is unauthorized for access to the computer system.

11. The computer system according to claim 1, further comprising a power source supplying operating power to the system unit, wherein the controller prevents the power source from supplying operating power to the system unit when the user is unauthorized for access to the computer system.

12. A method of controlling a computer system comprising a communication unit, the method comprising:
receiving through the communication unit from a server user authentication information corresponding to user identification information regarding at least one user of the computer system;
determining whether the at least one user is authorized to access the computer system or not based on the received user authentication information; and
controlling a system unit of the computer system not to perform an operation of a function when the at least one user is not authorized to access the computer system wherein the system unit comprises a graphic controller and at least one device unit for performing the operation of the function of which the computer system provides to the user that is authorized,
wherein the controller totally restricts access of the computer system when at least one of the communication unit and the identification information storage unit is not mounted in the computer system.

13. The method according to claim 12, wherein the controlling comprises outputting a control signal corresponding to the user authentication information and controlling the system unit to perform the operation of the function according to the control signal.

14. The method according to claim 12, further comprising informing the user that at least one of the communication unit and the identification information storage unit is not mounted in the computer system.

15. The method according to claim 12, wherein the controlling step comprises preventing the system unit from being booted up when the user is unauthorized for access to the computer system.

16. The method according to claim 12, wherein the controlling step comprises preventing a power source of the computer system from supplying operating power to the system unit when the user is unauthorized for access to the computer system.

17. A computer system comprising:
a system unit comprising a graphic controller, a display unit, and at least one device unit for performing an operation of a function of which the computer system can provide to a user;
an interface unit interfacing with a communication unit communicating with a server storing user authentication information about at least one user of the computer system; and
a controller receiving the user authentication information corresponding to user identification information about the user of the computer system through the communication unit, determining whether the user is authorized to access the computer system or not based on the received user authentication information and controlling the system unit not to perform an operation of the function when the user is authorized to access the computer system,
wherein the controller totally restricts access of the computer system when at least one of the communication unit and the identification information storage unit is not mounted to a main hoard.

* * * * *

UNITED STATES PATENT AND TRADEMARK OFFICE
CERTIFICATE OF CORRECTION

| | |
|---|---|
| PATENT NO. | : 8,701,203 B2 |
| APPLICATION NO. | : 12/829487 |
| DATED | : April 15, 2014 |
| INVENTOR(S) | : Woon-geun Kwak |

It is certified that error appears in the above-identified patent and that said Letters Patent is hereby corrected as shown below:

In the Claims

Column 8, Claim 1, Line 21 should read as follows:
--...a function which the...--

Column 10, Claim 17, Line 38 should read as follows:
--...to a main board...--

Signed and Sealed this
Twenty-fourth Day of June, 2014

Michelle K. Lee
*Deputy Director of the United States Patent and Trademark Office*